(12) United States Patent
Grimm (10) Patent No.: US 9,278,601 B1
(45) Date of Patent: Mar. 8, 2016

(54) SYSTEMS AND METHODS FOR AUTOMATED AIR SUSPENSION PRESSURE DROP

(71) Applicant: Bridgestone Americas Tire Operations, LLC, Nashville, TN (US)

(72) Inventor: John Harvey Grimm, Chandler, AZ (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 14/948,158

(22) Filed: Nov. 20, 2015

Related U.S. Application Data (62) Division of application No. 14/068,145, filed on Oct. 31, 2013, now Pat. No. 9,227,476.

(51) Int. Cl.
*B60G 17/052* (2006.01)

(52) U.S. Cl.
CPC ........ *B60G 17/052* (2013.01); *B60G 2202/152* (2013.01); *B60G 2300/04* (2013.01); *B60G 2401/12* (2013.01); *B60G 2500/201* (2013.01)

(58) Field of Classification Search
CPC combination set(s) only.
See application file for complete search history.

(56) References Cited

U.S. PATENT DOCUMENTS

| | | | |
|---|---|---|---|
| 5,193,063 | A | 3/1993 | Assh |
| 6,208,920 | B1 | 3/2001 | Izawa et al. |
| 6,540,307 | B1 | 4/2003 | Ward et al. |
| 6,578,648 | B2 | 6/2003 | Bell |
| 6,959,932 | B2 | 11/2005 | Svartz et al. |
| 7,677,339 | B2 | 3/2010 | Oscarsson |
| 8,002,065 | B2 | 8/2011 | Glavinic et al. |
| 8,437,911 | B2 | 5/2013 | Lanzilotta et al. |
| 8,521,361 | B2 | 8/2013 | Larkins et al. |
| 2003/0155164 | A1 | 8/2003 | Mantini et al. |
| 2004/0070160 | A1 | 4/2004 | Eberling et al. |
| 2005/0162004 | A1 | 7/2005 | Casak et al. |
| 2005/0263986 | A1 | 12/2005 | Miller et al. |
| 2006/0181048 | A1 | 8/2006 | Stowell et al. |
| 2007/0296173 | A1 | 12/2007 | Regnell et al. |
| 2009/0020982 | A1 | 1/2009 | Buckingham |
| 2009/0261551 | A1 | 10/2009 | Legros |

(Continued)

FOREIGN PATENT DOCUMENTS

KR  10-2001-0048727 A  6/2001

OTHER PUBLICATIONS

Bae, Geun Tae; International Search Report and Written Opinion for PCT patent application PCT/US2014/050121; Nov. 14, 2014; pp. 1-2; Korean Intellectual Property Office; Daejeon Metropolitan City, Republic of Korea.

*Primary Examiner* — Nicole Verley (57) ABSTRACT

Various systems and methods for automated air suspension pressure drop are disclosed. In one embodiment, a method for decreasing air pressure in an air spring is provided, comprising: providing a trailer, the trailer comprising: a first axle and a second axle, wherein at least one of the first axle and the second axle is operatively connected to at least one air spring; providing a strain gauge operatively connected to the trailer, wherein the strain gauge is configured to identify a lateral bending strain in the trailer; identifying the presence of the lateral bending strain in the trailer, wherein the lateral bending strain is about an axis substantially normal to the trailer's plane of travel; communicating the presence of the lateral bending strain in the trailer to a control unit operatively connected to the at least one air spring; and decreasing the air pressure in the at least one air spring.

18 Claims, 6 Drawing Sheets

(56) References Cited

U.S. PATENT DOCUMENTS

2012/0123646 A1 5/2012 Mantini et al.
2015/0034399 A1 2/2015 Clayton et al.

SYSTEMS AND METHODS FOR AUTOMATED AIR SUSPENSION PRESSURE DROP

CROSS-REFERENCE TO RELATED APPLICATIONS

This application claims priority as a divisional of U.S. patent application Ser. No. 14/068,145, filed on Oct. 31, 2013, which is incorporated by reference herein in its entirety.

BACKGROUND

Trailers are commonly used for transporting goods, equipment, materials, and the like. Many trailers include a plurality of axles, which may be separated from one another to distribute the load of the trailer more evenly. In some instances, these axles may be separated by 10 feet or more.

One problem associated with trailers having axles separated from one another is high lateral forces experienced in the tires of those axles during tight turning maneuvers. The high lateral forces may cause premature deterioration in the tires, which may lead to dangerous and costly tire failure. Also, trailers having separated axles may experience a strain as a result of the high lateral forces experienced in the tires of the axles.

Axles using air springs may be raised by decreasing pressure in the air springs, and may be lowered by increasing pressure in the air springs. Decreasing pressure in air springs associated with at least one axle will cause that axle to raise, and will transfer a majority of the load from the raised axle to an axle having air springs with higher pressure. The trailer may then pivot on the remaining axle (having air springs with higher pressure), thereby preventing high lateral forces to be experienced in the tires.

What is needed is a system for automatically decreasing pressure in a trailer's air spring.

SUMMARY

In one embodiment, a system for decreasing air pressure in an air spring is provided, the system comprising: a trailer, comprising: a first axle, a second axle, and at least one beam, wherein the first axle is operatively connected to the at least one beam and at least one air spring; a strain gauge operatively connected to the at least one beam; and a control unit operatively connected to the strain gauge and the at least one air spring.

In another embodiment, a system for decreasing air pressure in an air spring is provided, the system comprising: a system for decreasing air pressure in an air spring, comprising: a trailer, comprising: a first axle and a second axle, wherein at least one of the first axle and the second axle is operatively connected to at least one air spring; a strain gauge operatively connected to the trailer; and a control unit operatively connected to the strain gauge and the at least one air spring.

In one embodiment, a method for decreasing air pressure in an air spring is provided, the method comprising: providing a trailer, comprising: a first axle and a second axle, wherein at least one of the first axle and the second axle is operatively connected to at least one air spring; providing a strain gauge operatively connected to the trailer, wherein the strain gauge is configured to identify a lateral bending strain in the trailer; identifying the presence of the lateral bending strain in the trailer, wherein the lateral bending strain is about an axis substantially normal to the trailer's plane of travel; communicating the presence of the lateral bending strain in the trailer to a control unit operatively connected to the at least one air spring; and decreasing the air pressure in the at least one air spring.

In any or all of the embodiments, decreasing the air pressure in an air spring may comprise automatically decreasing the air pressure in an air spring.

BRIEF DESCRIPTION OF THE DRAWINGS

The accompanying figures, which are incorporated in and constitute a part of the specification, illustrate various example methods and systems, and are used merely to illustrate various example embodiments. In the figures, like elements bear like reference numerals.

DETAILED DESCRIPTION

Figure 1:
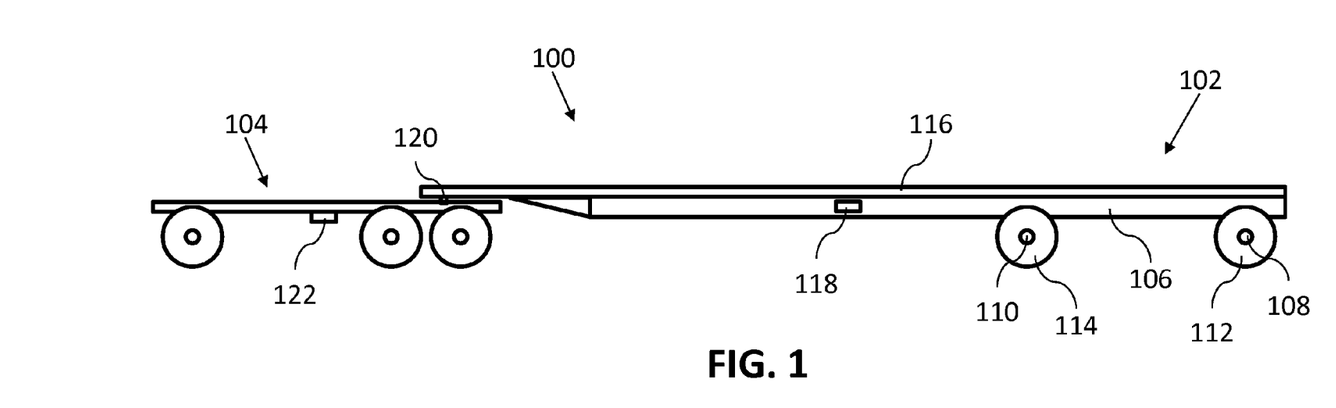
FIG. 1 illustrates an example arrangement of a system for automated air suspension pressure drop.

FIG. 1 illustrates an example arrangement of a system 100 for automated air suspension pressure drop. System 100 comprises a trailer 102 and a tractor 104. FIG. 1 represents a side view of trailer 102 and tractor 104. In one embodiment, trailer 102 and tractor 104 are configured for travel on roadways, such as public roadways. In another embodiment, trailer 102 and tractor 104 are configured for travel on jobsites. In another embodiment, trailer 102 and tractor 104 are configured for cross-country travel on roadways.

In one embodiment, trailer 102 and tractor 104 are operatively connected. In another embodiment, trailer 102 and tractor 104 are pivotally connected. In another embodiment, trailer 102 and tractor 104 are connected in a non-pivotal manner.

Trailer 102 may comprise at least one beam 106. Beam 106 may comprise an I-beam, a solid beam, an enclosed beam, or the like. In one embodiment, beam 106 comprises any elongated member configured to structurally support at least a portion of trailer 102. In one embodiment, beam 106 comprises at least a portion of trailer 102's frame. In one embodiment, beam 106 is an I-beam comprising at least one web and at least one flange.

In one embodiment, trailer 102 comprises, and beam 106 is operatively connected to, at least a first axle 108. In one embodiment, trailer 102 comprises, and beam 106 is operatively connected to, at least a second axle 110. In one embodiment, first axle 108 and second axle 110 are adjacent to one another. In another embodiment, first axle 108 and second axle 110 are separated from one another. In another embodiment, first axle 108 and second axle 110 are separated by a distance of about 10 ft. 2 in. In another embodiment, first axle 108 and second axle 110 are separated by a distance of less than about 10 ft. 2 in. In another embodiment, first axle 108 and second axle 110 are separated by a distance greater than about 10 ft. 2 in. In another embodiment, first axle 108 and second axle 110 are separated by a distance of at least about 8 ft.

First axle 108 may comprise at least one tire 112. In one embodiment, first axle 108 comprises a plurality of tires 112.

Second axle 110 may comprise at least one tire 114. In one embodiment, second axle 110 comprises a plurality of tires 114.

In one embodiment, trailer 102 is a platform trailer and comprises a platform 116. Trailer 102 may comprise a flatbed trailer with a platform 116 configured to haul any of a variety of items, including equipment, materials, vehicles, timber, pipe, or the like. In one embodiment, trailer 102 comprises a roll-back trailer. In another embodiment, trailer 102 comprises a dump trailer.

Tractor 104 may comprise any tractor configured to haul or move trailer 102.

In one embodiment, trailer 102 comprises a beam 106 operatively connected to at least one strain gauge 118. Strain gauge 118 may comprise any gauge configured to measure strain in an object. In one embodiment, strain gauge 118 is a Wheatstone bridge strain gauge. In one embodiment, at least one strain gauge 118 is directly connected to beam 106. In another embodiment, at least one strain gauge 118 is mounted on beam 106. In another embodiment, at least one strain gauge 118 is configured to measure strain in beam 106.

In one embodiment, beam 106 comprises a first end and a second end, and strain gauge 118 is oriented between the first end and the second end. Strain gauge 118 may be oriented substantially in the center of beam 106. In one embodiment, beam 106 comprises an I-beam including a web portion and at least two flange portions. Strain gauge 118 may be oriented on the web portion of beam 106.

In one embodiment, strain gauge 118 is configured to identify a lateral bending strain in beam 106, wherein the lateral bending strain is about an axis substantially normal to trailer 102's plane of travel. In another embodiment, strain gauge 118 is configured to identify longitudinal deformation in beam 106. In another embodiment, strain gauge 118 is configured to identify any deformation in beam 106.

In one embodiment, strain gauge 118 is oriented on at least one of first axle 108 and second axle 110. In another embodiment, strain gauge 118 is operatively connected to at least one of first axle 108 and second axle 110. Strain gauge 118 may be configured to sense strain in at least one of first axle 108 and second axle 110. Strain gauge 118 may be configured in one embodiment to sense lateral force in at least one of first axle 108 and second axle 110.

In one embodiment, at least one of first axle 108 and second axle 110 are connected to trailer 102 via, among other items, at least one bushing. At least one of first axle 108 and second axle 110 may comprise at least one bushing oriented between trailer 102 and at least one of first axle 108 and second axle 110. In one embodiment, at least one strain gauge 118 may be configured to identify strain in the at least one bushing.

In one embodiment, trailer 102 and tractor 104 are connected via a kingpin 120. Kingpin 120 may comprise a pivot point between trailer 102 and tractor 104.

In one embodiment, at least one of trailer 102 and tractor 104 comprises a control unit 122. Control unit 122 may comprise at least one of a computer, a sensor, and a switch. Control unit 122 may be operatively connected to at least one strain gauge 118. In one embodiment, control unit 122 is electrically connected to at least one strain gauge 118.

In one embodiment, control unit 122 is operatively connected to at least one air spring (not shown), which is operatively connected to trailer 102. In one embodiment, trailer 102 comprises at least one air spring (not shown) oriented between beam 106 and at least one of first axle 108 and second axle 110. In one embodiment, control unit 122 is operatively connected to at least one strain gauge 118 and is configured to receive a strain signal from strain gauge 118. In another embodiment, control unit 122 is operatively connected to at least one strain gauge 118 and is configured to sense strain in strain gauge 118, after which control unit 122 causes at least one air spring in trailer 102 (not shown) to lower its air pressure.

Figure 2:
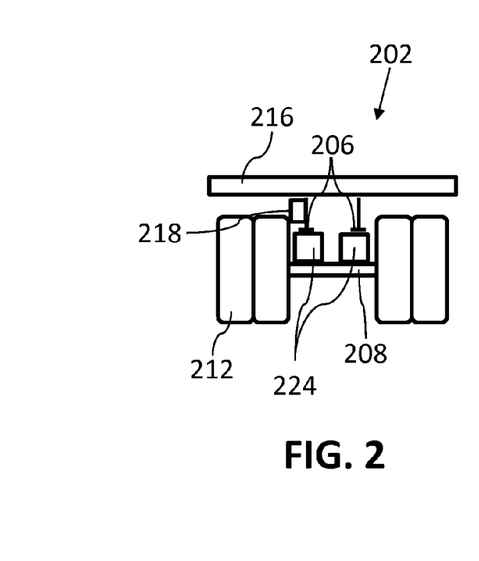
FIG. 2 illustrates an example arrangement of a system for automated air suspension pressure drop.

FIG. 2 illustrates an example arrangement of a system 200 for automated air suspension pressure drop. System 200 comprises a trailer 202. FIG. 2 represents a rear view of trailer 202. Trailer 202 may comprise at least one beam 206. Trailer 202 may also comprise a first axle 208 including at least one tire 212.

In one embodiment, trailer 202 comprises a platform 216. Platform 216 may be operatively connected to at least one beam 206. At least one beam 206 may be operatively connected to first axle 208.

In one embodiment, system 200 comprises at least one strain gauge 218. At least one strain gauge 218 may be operatively connected to at least one beam 206. In one embodiment, system 200 comprises a plurality of stain gauge 218. At least one strain gauge 218 may be operatively connected to at least one of beam 206, first axle 208, and platform 216.

System 200 may comprise at least one air spring 224. At least one air spring 224 may comprise a flexible bellows configured to hold a volume of air at a desired pressure, wherein the volume of air within the flexible bellows determines the spring rate of at least one air spring 224. At least one air spring 224 may comprise a flexible bellows configured to hold a volume of air at any of a variety of pressures, wherein the flexible bellows expands upon application of a greater volume of air and contracts upon application of a lesser volume of air.

In one embodiment, at least one air spring 224 is operatively connected to first axle 208 and beam 206. In another embodiment, at least one air spring 224 is oriented between first axle 208 and beam 206. At least one air spring 224 may at least partially control the distance between beam 206 and first axle 208, such that increasing the air pressure in at least one air spring 224 increases the distance between beam 206 and first axle 208. Likewise, lowering the air pressure in at least one air spring 224 decreases the distance between beam 206 and first axle 208.

In one embodiment, system 200 comprises a control unit (not shown) operatively connected to at least one air spring 224. In another embodiment, system 200 comprises a control unit (not shown) operatively connected to at least one strain gauge 218. At least one strain gauge 218 may indicate strain in trailer 202 (e.g., strain in beam 206), wherein a control unit (not shown) may cause at least one air spring 224 to decrease its air pressure.

Figure 3:
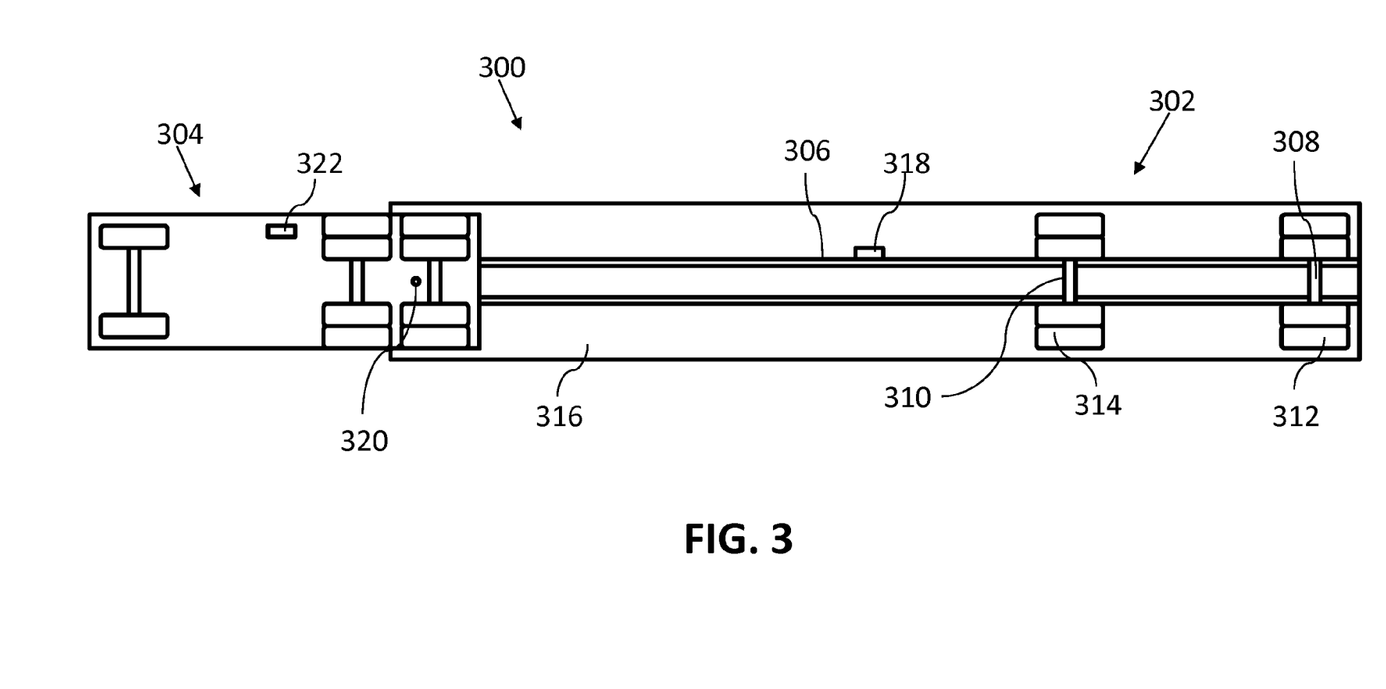
FIG. 3 illustrates an example arrangement of a system for automated air suspension pressure drop.

FIG. 3 illustrates an example arrangement of a system 300 for automated air suspension pressure drop. System 300 may comprise a trailer 302 including at least one beam 306, and a tractor 304. FIG. 3 represents a bottom view of trailer 302 and tractor 304. In one embodiment, trailer 302 comprises two beams 306, oriented on each side of trailer 302.

Trailer 302 may comprise a first axle 308 and a second axle 310. First axle 308 may comprise at least one tire 312. Second axle 310 may comprise at least one tire 314. In one embodiment, trailer 302 comprises a platform 316.

System 300 may comprise at least one strain gauge 318 configured to sense strain in trailer 302. In one embodiment, at least one strain gauge 318 is operatively connected to at least one beam 306. In another embodiment, trailer 302 comprises a plurality of beams 306, and one or more of beams 306 comprises a strain gauge 318.

Tractor 304 and trailer 302 may be pivotally connected via a kingpin 320.

In one embodiment, system 300 comprises a control unit 322. In one embodiment, control unit 322 is oriented on tractor 304. In another embodiment, control unit 322 is oriented on trailer 302. Control unit 322 may be operatively connected to at least one of strain gauge 318 and at least one air spring (not shown).

Figure 4:
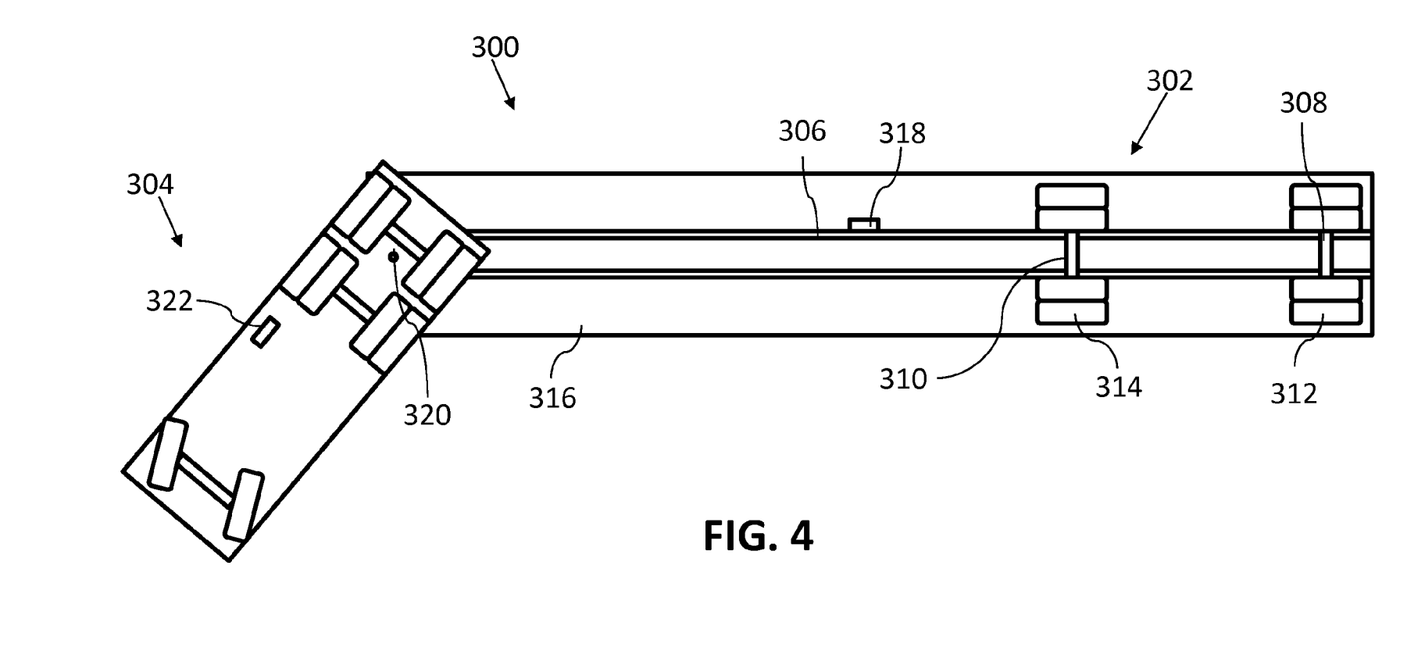
FIG. 4 illustrates an example arrangement of a system for automated air suspension pressure drop.

FIG. 4 represents a bottom view of trailer 302 and tractor 304 of system 300 in a turning maneuver. In one embodiment, tractor 304 causes trailer 302 to turn. Trailer 302 comprises first axle 308 and second axle 310. As a result of the distance between first axle 308 and second axle 310, excessive lateral force is generated by at least one tire 312 and at least one tire 314 interacting with a road surface during the turning maneuver. Excessive force generated by at least one tire 312 and at least one tire 314 interacting with a road surface may cause a strain in trailer 302. In one embodiment, strain in trailer 302 is sensed by at least one strain gauge 318, which is connected to trailer 302.

In one embodiment, strain gauge 318 communicates a signal to control unit 322. Upon receiving a strain signal from strain gauge 318, control unit 322 may cause at least one air spring (not shown) to decrease its air pressure. In one embodiment, control unit 322 causes at least one air spring associated with first axle 308 to decrease its pressure, thereby transferring the majority of the load of trailer 302 to second axle 310. With less or no load on first axle 308, and more or all load on second axle 310, trailer 302 may complete its turning maneuver while eliminating lateral forces generated by at least one tire 312.

In another embodiment, tractor 304 causes trailer 302 to stop turning and travel straight, thereby completing its turning maneuver. Strain gauge 318 may sense reduced or no strain and may communicate a signal to control unit 322 to cause at least one air spring associated with first axle 308 to increase its pressure, thereby distributing the load of trailer 302 to both first axle 308 and second axle 310.

In one embodiment, control unit 322 causes at least one air spring associated with second axle 310 to reduce pressure during a turning maneuver instead of first axle 308, thereby transferring the majority of the load of trailer 302 to first axle 308. Upon completing its turning maneuver, strain gauge 318 may sense reduced or no strain and may communicate a signal to control unit 322 to cause at least one air spring associated with second axle 310 to increase its pressure, thereby distributing the load of trailer 302 to both first axle 308 and second axle 310.

In one embodiment, at least one of first axle 308 and second axle 310 comprise a plurality of air springs, and control unit 322 causes one or all of the air springs associated with first axle 308 or second axle 310 to decrease or increase pressure as necessary for trailer 302 to execute a turning maneuver.

In one embodiment, at least one strain gauge 318 communicates directly with at least one air spring (not shown) associated with at least one of first axle 308 and second axle 310, and causes the at least one air spring to decrease or increase its pressure as necessary for executing a turning maneuver.

In one embodiment, trailer 302 includes one or more axle in addition to first axle 308 and second axle 310. The one or more additional axle (not shown) may additionally include at least one air spring (not shown). The pressure in the at least one air spring associated with the at least one additional axle may also be decreased so as to cause the majority or all of the load of trailer 302 to be directed to a single axle, such as first axle 308 or second axle 310.

In one embodiment, tractor 304 is fixedly connected to trailer 302, rather than pivotally connected. In such an embodiment, tractor 304 and trailer 302 do not pivot relative to one another. One example embodiment includes a multi-axle dump truck. In such an embodiment, strain is sensed by strain gauge 318 in the same manner as a pivotally connected tractor 304 and trailer 302, and the same concepts of reducing or increasing pressure in one or more air springs associated with any of the multiple axles (e.g., first axle 308 and second axle 310) may be applied.

In one embodiment, during a turning maneuver, control unit 322 may cause the at least one air spring (not shown) associated with one of first axle 308 and second axle 310 to increase in pressure, thereby causing the majority of the load of trailer 302 to be transferred to that axle. In another embodiment, during a turning maneuver, control unit 322 may cause the at least one air spring (not shown) associated with one of first axle 308 and second axle 310 to increase in pressure, while also causing the at least one air spring (not shown) associated with the other axle to decrease in pressure. Upon completion of the turning maneuver, control unit 322 may cause the at least one air spring (not shown) associated with first axle 308 and second axle 310 to decrease and increase in pressure as necessary to distribute the load of trailer 302 to both first axle 308 and second axle 310.

Figure 5:
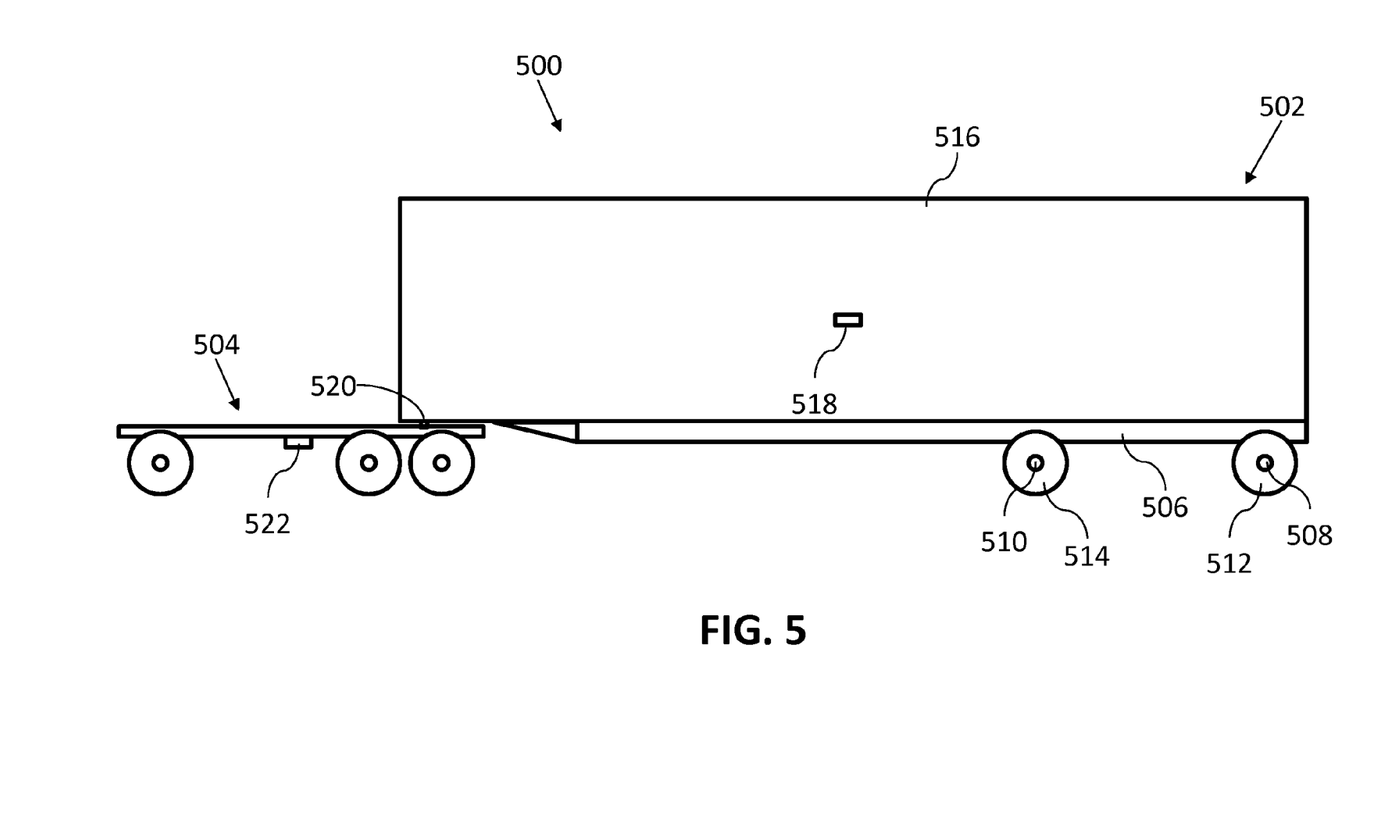
FIG. 5 illustrates an example arrangement of a system for automated air suspension pressure drop.

FIG. 5 illustrates an example arrangement of a system 500 for automated air suspension pressure drop. System 500 may comprise a trailer 502 including at least one beam 506, and a tractor 504. FIG. 5 represents a side view of trailer 502 and tractor 504. Trailer 502 may comprise a first axle 508 and a second axle 510. First axle 508 may comprise at least one tire 512. Second axle 510 may comprise at least one tire 514.

Trailer 502 may comprise at least one enclosure 516. In one embodiment, enclosure 516 comprises a van. In another embodiment, enclosure 516 comprises at least one of a van, a container, a tanker, a dump bed, and the like. In one embodiment, stresses experienced during a turning maneuver may be transmitted into at least one side of enclosure 516.

In one embodiment, system 500 comprises at least one strain gauge 518. At least one strain gauge 518 may be oriented on at least one side of enclosure 516. At least one strain gauge may be configured to sense strain in at least one side of enclosure 516.

Trailer 502 may be pivotally attached to tractor 504 via a kingpin 520. In another embodiment, trailer 502 is fixedly attached to tractor 504 via kingpin 520.

In one embodiment, system 500 comprises a control unit 522. Control unit 522 may be oriented on at least one of tractor 504 and trailer 502. Control unit 522 may be operatively connected to at least one strain gauge 518.

In one embodiment, when trailer 502 executes a training maneuver, enclosure 516 experiences strain. At least one strain gauge 518 may sense the strain and communicate a strain signal to control unit 522. Control unit 522 may cause at least one air spring (not shown) associated with at least one of first axle 508 and second axle 510 to decrease its air pressure.

Upon completion of the turning maneuver, at least one strain gauge 518 may sense a decrease of strain in enclosure 516. Strain gauge 518 may communicate a decrease of strain to control unit 522. Control unit 522 may cause at least one air spring (not shown) associated with at least one of first axle 508 and second axle 510 to increase its air pressure.

Figure 6:
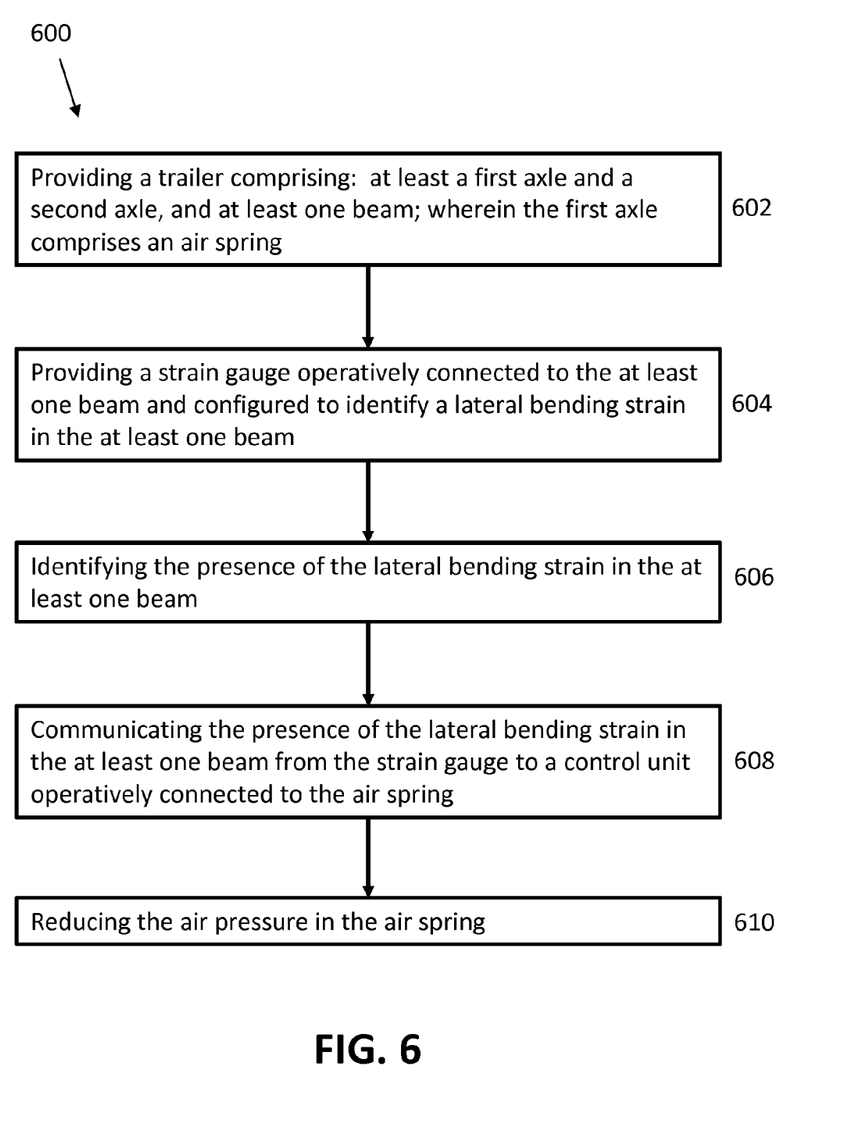
FIG. 6 illustrates an example method for automated air suspension pressure drop.

FIG. 6 illustrates an example method 600 for automated air suspension pressure drop. Method 600 includes providing a trailer, comprising: at least a first axle and a second axle, and at least one beam; wherein the first axle comprises an air spring (step 602). Method 600 also includes providing a strain gauge operatively connected to the at least one beam and configured to identify a lateral bending strain in the at least one beam (step 604). Method 600 additionally includes identifying the presence of the lateral bending strain in the at least one beam (step 606). The presence of the lateral bending strain in the at least one beam is communicated from the strain gauge to a control unit operatively connected to the air spring (step 608). The air pressure in the air spring is reduced (step 610).

Figure 7:
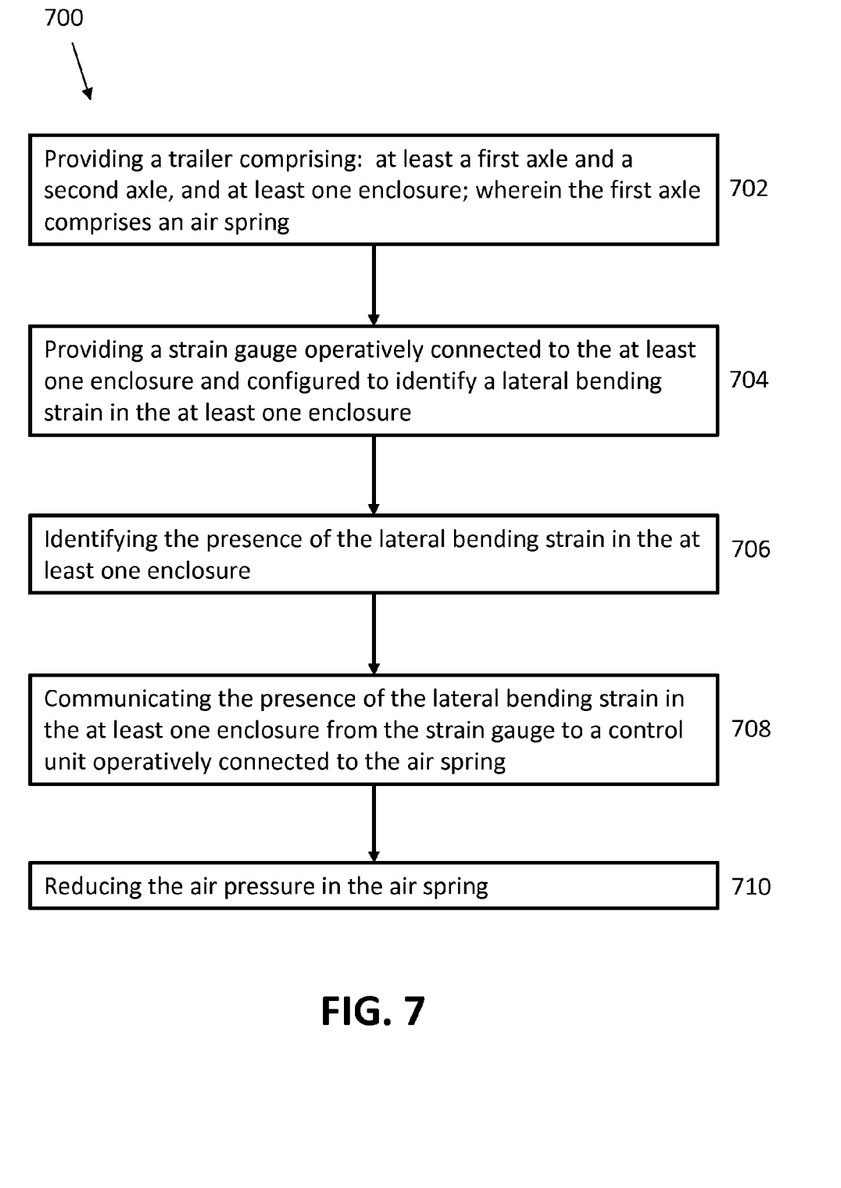
FIG. 7 illustrates an example method for automated air suspension pressure drop.

FIG. 7 illustrates an example method 700 for automated air suspension pressure drop. Method 700 includes providing a trailer, comprising: at least a first axle and a second axle, and at least one enclosure; wherein the first axle comprises an air spring (step 702). Method 700 also includes providing a strain gauge operatively connected to the at least one enclosure and configured to identify a lateral bending strain in the at least one enclosure (step 704). Method 700 additionally includes identifying the presence of the lateral bending strain in the at least one enclosure (step 706). The presence of the lateral bending strain in the at least one enclosure is communicated from the strain gauge to a control unit operatively connected to the air spring (step 708). The air pressure is reduced in the air spring (step 710).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A method for decreasing air pressure in an air spring, comprising:
   providing a trailer, the trailer comprising: a first axle and a second axle,
      wherein at least one of the first axle and the second axle is operatively connected to at least one air spring;
   providing a strain gauge operatively connected to the trailer, wherein the strain gauge is configured to identify a lateral bending strain in the trailer;
   identifying the presence of the lateral bending strain in the trailer,
      wherein the lateral bending strain is about an axis substantially normal to the trailer's plane of travel;
   communicating the presence of the lateral bending strain in the trailer to a control unit operatively connected to the at least one air spring; and
   decreasing the air pressure in the at least one air spring.

2. The method of claim 1, wherein the control unit is configured to decrease pressure in the at least one air spring in response to identification of the lateral bending strain.

3. The method of claim 1, wherein the trailer further comprises at least one beam, and wherein the strain gauge is operatively connected to the at least one beam.

4. The method of claim 3, wherein the at least one beam comprises a web portion, and wherein the strain gauge is oriented on the web portion.

5. The method of claim 1, wherein the trailer further comprises at least one beam, and wherein the strain gauge is configured to identify a lateral bending strain in the at least one beam.

6. The method of claim 5, wherein the at least one beam comprises a web portion, and wherein the strain gauge is oriented on the web portion.

7. The method of claim 1, wherein the trailer further comprises at least one beam, wherein the beam comprises a center, and wherein the strain gauge is oriented substantially in the center of the beam.

8. The method of claim 1, wherein the trailer further comprises at least one enclosure, and wherein the strain gauge is operatively connected to the at least one enclosure.

9. The method of claim 1, wherein the trailer further comprises at least one enclosure, and wherein the strain gauge is configured to identify a lateral bending strain in the at least one enclosure.

10. The method of claim 1, wherein the first axle and the second axle are separated by a distance of at least about 8 ft.

11. A method for decreasing air pressure in an air spring, comprising:
   providing a trailer, the trailer comprising: a first axle, a second axle, and at least one beam,
      wherein at least one of the first axle and the second axle is operatively connected to at least one air spring;
   providing a strain gauge operatively connected to the at least one beam, wherein the strain gauge is configured to identify a lateral bending strain in the at least one beam;
   identifying the presence of the lateral bending strain in the at least one beam,
      wherein the lateral bending strain is about an axis substantially normal to the trailer's plane of travel;
   communicating the presence of the lateral bending strain in the at least one beam to a control unit operatively connected to the at least one air spring; and
   decreasing the air pressure in the at least one air spring.

12. The method of claim 11, wherein the control unit is configured to decrease pressure in the at least one air spring in response to identification of the lateral bending strain.

13. The method of claim 11, wherein the at least one beam comprises a web portion, and wherein the strain gauge is oriented on the web portion.

14. The method of claim 11, wherein the at least one beam comprises a center, and wherein the strain gauge is oriented substantially in the center of the beam.

15. The method of claim 11, wherein the first axle and the second axle are separated by a distance of at least about 8 ft.

16. A method for decreasing air pressure in an air spring, comprising:
   providing a trailer, the trailer comprising: a first axle, a second axle, and at least one enclosure,
      wherein at least one of the first axle and the second axle is operatively connected to at least one air spring;
   providing a strain gauge operatively connected to the at least one enclosure wherein the strain gauge is configured to identify a lateral bending strain in the at least one enclosure;
   identifying the presence of the lateral bending strain in the at least one enclosure,
      wherein the lateral bending strain is about an axis substantially normal to the trailer's plane of travel;
   communicating the presence of the lateral bending strain in the at least one enclosure to a control unit operatively connected to the at least one air spring; and
   decreasing the air pressure in the at least one air spring.

17. The method of claim 16, wherein the control unit is configured to decrease pressure in the at least one air spring in response to identification of the lateral bending strain.

18. The method of claim 16, wherein the first axle and the second axle are separated by a distance of at least about 8 ft.

* * * * *